(12) United States Patent
Jun

(10) Patent No.: US 11,086,103 B2
(45) Date of Patent: Aug. 10, 2021

(54) LENS MODULE, CAMERA MODULE, AND PORTABLE ELECTRONIC DEVICE

(71) Applicant: SAMSUNG ELECTRO-MECHANICS CO., LTD., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 66 days.

(21) Appl. No.: 16/575,999

(22) Filed: Sep. 19, 2019

(65) Prior Publication Data

US 2020/0142161 A1 May 7, 2020

(30) Foreign Application Priority Data

Nov. 5, 2018 (KR) .......................... 10-2018-0134615

(51) Int. Cl.
*G02B 13/00* (2006.01)
*G02B 7/02* (2021.01)
(Continued)

(52) U.S. Cl.
CPC .......... *G02B 13/0015* (2013.01); *G02B 7/021* (2013.01); *G02B 7/026* (2013.01);
(Continued)

(58) Field of Classification Search
CPC ..... F03G 7/065; G02B 13/0015; G02B 13/16; G02B 27/646; G02B 7/021; G02B 7/026;
(Continued)

(56) References Cited

U.S. PATENT DOCUMENTS 7,796,881 B2    9/2010  Chang
9,518,566 B2   12/2016  Eddington et al.
(Continued)

FOREIGN PATENT DOCUMENTS

CN    101893748 A    11/2010
CN    104335101 A     2/2015
(Continued)

OTHER PUBLICATIONS

Korean Office Action dated Nov. 19, 2019 in counterpart Korean Patent Application No. 10-2018-0134615 (7 pages in English and 5 pages in Korean).

(Continued)

*Primary Examiner* — Chiawei Chen
(74) *Attorney, Agent, or Firm* — NSIP Law

(57) ABSTRACT

A lens module includes a carrier having an internal space, a lens unit including a plurality of lens groups and disposed in the carrier so that one or more of the lens groups is movable in a length direction of the carrier, a lens guide unit connected to the one or more movable lens groups to guide movement of the one or more movable lens groups, and a lens driving unit connected to the lens guide unit and including a plurality of driving wires formed of a shape memory alloy. The lens guide unit is moved in a height direction of the carrier by expansion and contraction of the plurality of driving wires to move the one or more lens groups in the length direction of the carrier.

19 Claims, 10 Drawing Sheets

(51) Int. Cl.
  *G02B 7/28* (2021.01)
  *G02B 13/16* (2006.01)
  *H04N 5/225* (2006.01)
(52) U.S. Cl.
  CPC ............. *G02B 7/282* (2013.01); *G02B 13/16*
    (2013.01); *H04N 5/2254* (2013.01)
(58) Field of Classification Search
  CPC .......... G02B 7/08; G02B 7/102; G02B 7/282;
    H04N 5/2254; H04N 5/2328; G03B
    2205/0076; G03B 13/36; G03B 3/10
  See application file for complete search history.

(56) References Cited

U.S. PATENT DOCUMENTS

| | | | |
|---|---|---|---|
| 9,547,151 B2 | 1/2017 | Lee et al. | |
| 2006/0139767 A1* | 6/2006 | Lee | G02B 15/144511 359/684 |
| 2006/0266031 A1* | 11/2006 | Kosaka | G02B 7/102 60/527 |
| 2007/0103792 A1* | 5/2007 | Ueda | G02B 15/144515 359/684 |
| 2007/0127139 A1* | 6/2007 | Funahashi | G02B 7/10 359/696 |
| 2009/0097841 A1* | 4/2009 | Chang | G02B 7/021 396/529 |
| 2009/0185032 A1* | 7/2009 | Sakai | A61B 1/00096 348/65 |
| 2012/0050895 A1* | 3/2012 | Kotanagi | G02B 7/025 359/823 |
| 2012/0162402 A1* | 6/2012 | Amano | A61B 1/00188 348/65 |
| 2014/0009631 A1 | 1/2014 | Topliss | |
| 2015/0135703 A1* | 5/2015 | Eddington | H04N 5/23287 60/528 |
| 2015/0168677 A1* | 6/2015 | Lee | G02B 13/0045 348/222.1 |
| 2017/0108705 A1* | 4/2017 | Yu | G02B 13/009 |
| 2018/0031854 A1 | 2/2018 | Hu et al. | |
| 2018/0171991 A1* | 6/2018 | Miller | F16M 11/18 |
| 2020/0014850 A1* | 1/2020 | Zhang | G02B 27/646 |
| 2020/0041872 A1* | 2/2020 | Kopfer | G03B 17/02 |
| 2020/0073140 A1 | 3/2020 | Eddington et al. | |
| 2020/0310224 A1* | 10/2020 | Fang | H02K 41/035 |

FOREIGN PATENT DOCUMENTS

| | | | |
|---|---|---|---|
| CN | 107664895 A | 2/2018 | |
| CN | 110537130 A | 12/2019 | |
| JP | 5030762 B2 | 7/2012 | |
| KR | 10-0730910 B1 | 6/2007 | |
| KR | 10-2015-0013555 A | 2/2015 | |
| KR | 10-2015-0070858 A | 6/2015 | |
| WO | WO 2010/089529 A1 | 8/2010 | |
| WO | WO-2014091399 A2 * | 6/2014 | ........... H04N 5/2254 |

OTHER PUBLICATIONS

Chinese Office Action dated May 25, 2021 in counterpart Chinese Patent Application No. 201911069931.6 (4 pages in English, 5 pages in Chinese).

* cited by examiner

LENS MODULE, CAMERA MODULE, AND PORTABLE ELECTRONIC DEVICE

CROSS-REFERENCE TO RELATED APPLICATIONS

This application claims the benefit under 35 U.S.C. 119(a) of Korean Patent Application No. 10-2018-0134615 filed on Nov. 5, 2018, in the Korean Intellectual Property Office, the entire disclosure of which is incorporated herein by reference for all purposes.

BACKGROUND

1. Field

The present disclosure relates to a lens module, a camera module, and a portable electronic device.

2. Description of the Background

Recently, camera modules have become standard in portable electronic devices such as tablet personal computers (PCs), laptop computers, and the like, as well as smartphones. Also, an autofocusing function, an optical image stabilization (OIS) function, a zoom function, and the like, have been added to camera modules for mobile terminals.

However, in order to implement various functions, a structure of the camera module has become complicated and a size of the camera module has been increased, resulting in an increase in a size of the portable electronic device in which the camera module is mounted.

With the growth of the smartphone camera market, attempts have continuously been made to miniaturize and integrate the functions of conventional general passive cameras, such as autofocusing (AF), optical zoom, and the like along with an OIS driving method. As a result, there is demand for OIS driving methods other than the conventional OIS method according to diversification of the structure.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a carrier having an internal space, a lens unit including a plurality of lens groups and disposed in the carrier so that one or more of the lens groups is movable in a length direction of the carrier, a lens guide unit connected to the one or more movable lens groups to guide movement of the one or more moveable lens groups; and a lens driving unit connected to the lens guide unit and including a plurality of driving wires comprising a shape memory alloy, wherein the lens guide unit is moved in a height direction of the carrier by expansion and contraction of the plurality of driving wires to move the one or more movable lens groups in the length direction of the carrier.

The plurality of driving wires may be disposed in pairs comprising two wires disposed to intersect each other, and two of the pairs of driving wires may be disposed to be spaced apart from each other in the height direction of the carrier.

The carrier may further include a guide hole in one side surface of the carrier, the guide hole configured to guide the movement of the one or more movable lens groups.

Guide grooves for guiding the movement of the lens guide unit may be disposed on both sides of the guide hole in the one side surface of the carrier.

The one side surface of the carrier may include carrier stoppers disposed on upper and lower portions of the guide hole to limit the movement of the lens guide unit.

The plurality of lens groups may include a first lens group fixed on one end of the carrier, a second lens group disposed on a rear end of the first lens group according to a direction of incident light and being one of the one or more movable lens groups, a third lens group disposed on a rear end of the second lens group and being another one of the one or more movable lens groups, and a fourth lens group disposed on a rear end of the third lens group and fixed on the other end of the carrier.

The second and third lens groups may include protrusions connected to the lens guide unit.

The lens guide unit may include a lens guide body disposed on the carrier to ascend and descend in the height direction of the carrier, a first lens guide disposed on an upper portion of the lens guide body, a second lens guide disposed on a lower portion of the lens guide body, and a spring having one end supported by the first lens guide and the other end supported by the second lens guide.

Both end portions of the lens guide body may include installation grooves disposed therein, the first and second lens guides being disposed in the installation grooves.

The lens guide body may include first guide grooves disposed therein, the first guide grooves guiding the movement of the one or more movable lens groups.

The first and second lens guides may include respective first and second extending grooves disposed therein, respectively, the first and second extending grooves being connected to the first guide grooves.

The first and second lens guides may further include respective first and second spring mounting grooves disposed therein, respectively, the spring being disposed in the first and second spring mounting grooves.

The first lens guide may be supported by a carrier stopper disposed on an upper end portion of one side surface of the carrier, and the second lens guide may be supported by a carrier stopper disposed on a lower end portion of the one side surface of the carrier.

The lens driving unit may further include a lens driving unit body fixed on the lens guide unit, a first installation member fixed on the carrier disposed above an upper portion of the lens driving unit body, a second installation member fixed on the carrier disposed below a lower portion of the lens driving unit body, and the driving wires may have one end connected to any one of the first and second installation members and the other end connected to the lens driving unit body.

When one pair of the two pairs of driving wires is contracted, the remaining pair of driving wires may be stretched.

A camera module may include a reflecting module converting a path of light incident thereinto, and the lens module through which the light having the path converted by the reflecting module may pass.

A portable electronic device may include the camera module and an image sensor configured to convert light that passes through the lens module into an electrical signal.

In another general aspect, a lens module includes a movable lens group having one or more lenses and movable in an optical axis direction of the one or more lenses, and a lens driving unit coupled to the movable lens group and configured to move the movable lens group in the optical axis direction in response to a lens driving unit movement in a direction substantially perpendicular to the optical axis direction by expansion of a shape memory alloy.

A camera module may include a reflecting module configured to convert a path of light incident thereinto, and the lens module through which the light having the path converted by the reflecting module may pass through the one or more lenses.

A portable electronic device may include a case having a thickness, a width greater than the thickness, and a length greater than the thickness, the camera module disposed in the case, and an image sensor configured to convert light that passes through the lens module into an electrical signal, wherein the optical axis direction may be substantially perpendicular to a thickness direction of the case.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
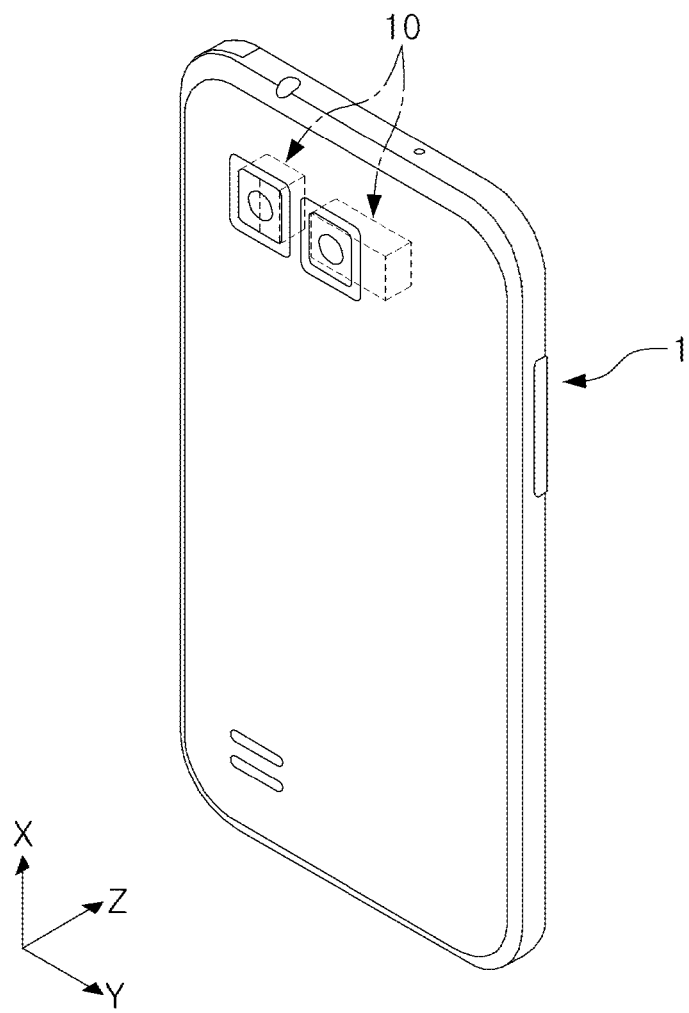
FIG. 1 is a perspective view of an example portable electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure provides a lens module that may prevent degradations in image quality of a high magnification zoom function. An aspect of the present disclosure also provides a camera module that includes a lens module that may prevent degradations in image quality of a high magnification zoom function.

FIG. 1 is a perspective view of a portable electronic device according to one or more examples.

Referring to FIG. 1, a portable electronic device 1 according to one or more examples may be a portable electronic device such as a mobile communications terminal, a smartphone, a tablet personal computer (PC), or the like, in which camera modules 10 are mounted.

As illustrated in FIG. 1, the portable electronic device 1 may be mounted with two camera modules 10 to capture an image of a subject.

In the present example, one camera module 10 may include a plurality of lenses, and an optical axis (Y axis) of each of the lenses may be directed in a direction perpendicular to a thickness direction (a Z-axis direction, a direction from a front surface of the portable electronic device to a rear surface thereof, or a direction opposite to the direction from the front surface of the portable electronic device to the rear surface thereof) of the portable electronic device 1.

In the present example, an optical axis (Z axis) of each of a plurality of lenses included in the other camera module 10 may be formed in the thickness direction (the Z-axis direction) of the portable electronic device 1.

Therefore, even though the camera module 10 has functions such as an autofocusing (hereinafter, referred to as AF) function, a zoom function, and an optical image stabilization (hereinafter, referred to as OIS) function, a thickness of the portable electronic device 1 may be prevented from increasing. Therefore, the portable electronic device 1 may be miniaturized.

The camera module 10 may have one or more of the AF function, the zoom function, and the OIS function.

Since the camera module 10 including the AF function, the zoom function, the OIS function, and the like, needs to include various components, a size of the camera module may be increased as compared to a general camera module.

When the size of the camera module 10 is increased, a problem may occur in miniaturizing the portable electronic device 1 in which the camera module 10 is mounted.

For example, when the number of stacked lenses in the camera module is increased for the purpose of the zoom function and a plurality of stacked lenses are formed in the camera module in the thickness direction of the portable electronic device, a thickness of the portable electronic device may also be increased, depending on the number of stacked lenses. Therefore, when the thickness of the portable electronic device is not increased, the number of stacked lenses may not be sufficiently secured, such that zoom performance may be deteriorated.

In addition, an actuator moving a lens group in an optical axis direction or a direction perpendicular to the optical axis needs to be installed in order to implement the AF function and the OIS function, and when the optical axis (the Z axis) of the lens group is formed in the thickness direction of the portable electronic device, the actuator moving the lens group needs also to be installed in the thickness direction of the portable electronic device. Therefore, the thickness of the portable electronic device may be increased.

However, in the camera module 10 according to the exemplary embodiment in the present disclosure, the optical axis (the Y axis) of each of the plurality of lenses is disposed perpendicularly to the thickness direction of the portable electronic device 1. Therefore, even though the camera module 10 having the AF function, the zoom function, and the OIS function is mounted in the portable electronic device 1, the portable electronic device 1 may be miniaturized.

Figure 2:
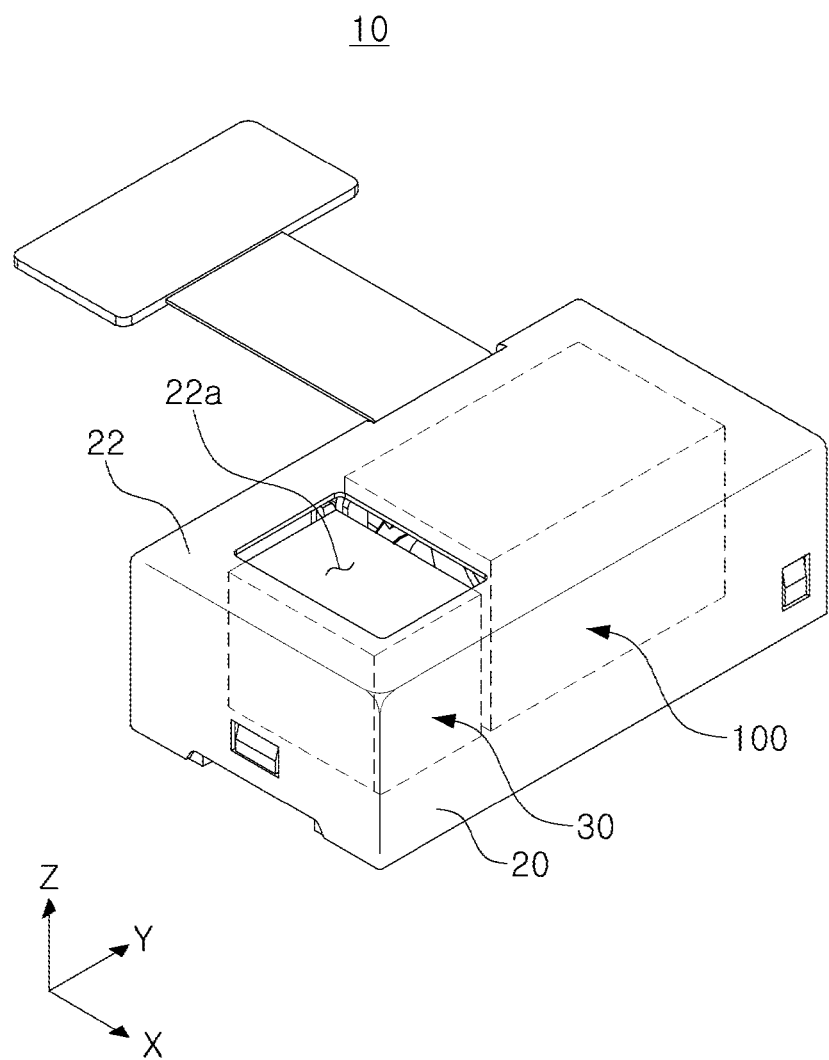
FIG. 2 is a schematic perspective view of a camera module according to one or more examples.

FIG. 2 is a schematic perspective view of a camera module according to one or more examples.

Referring to FIG. 2, the camera module 10 may include a reflecting module 30, a lens module 100, and an image sensor module (not illustrated) provided in a housing 20.

The reflecting module 30 may change a moving direction of light. As an example, a moving direction of light incident through an opening 22a of a cover 22 covering the camera module 10 above the camera module 10 may be changed to be directed toward the lens module 100 through the reflecting module 30. To this end, the reflecting module 30 may include a reflecting member (not illustrated) reflecting the light.

A path of the light incident through the opening 22a may be changed by the reflecting module 30 so that the light is directed toward the lens module 100. For example, a path of light incident to the camera module 10 in the thickness direction (the Z-axis direction) of the camera module 10 may be changed by the reflecting module 30 to approximately coincide with the optical axis (the Y axis) direction.

The lens module 100 may include a plurality of lenses through which the light of which the moving direction is changed by the reflecting module 30 passes, and the image sensor module may include an image sensor (not illustrated) converting the light passing through the plurality of lenses into an electrical signal and a printed circuit board (not illustrated) on which the image sensor is mounted. In addition, the image sensor module may include an optical filter (not illustrated) filtering the light incident from the lens module 100 thereto. The optical filter (not illustrated) may be an infrared cut-off filter.

In an internal space of the housing 20, the reflecting module 30 may be provided in front of the lens module 100 and the image sensor module may be provided behind the lens module 100.

Figure 3:
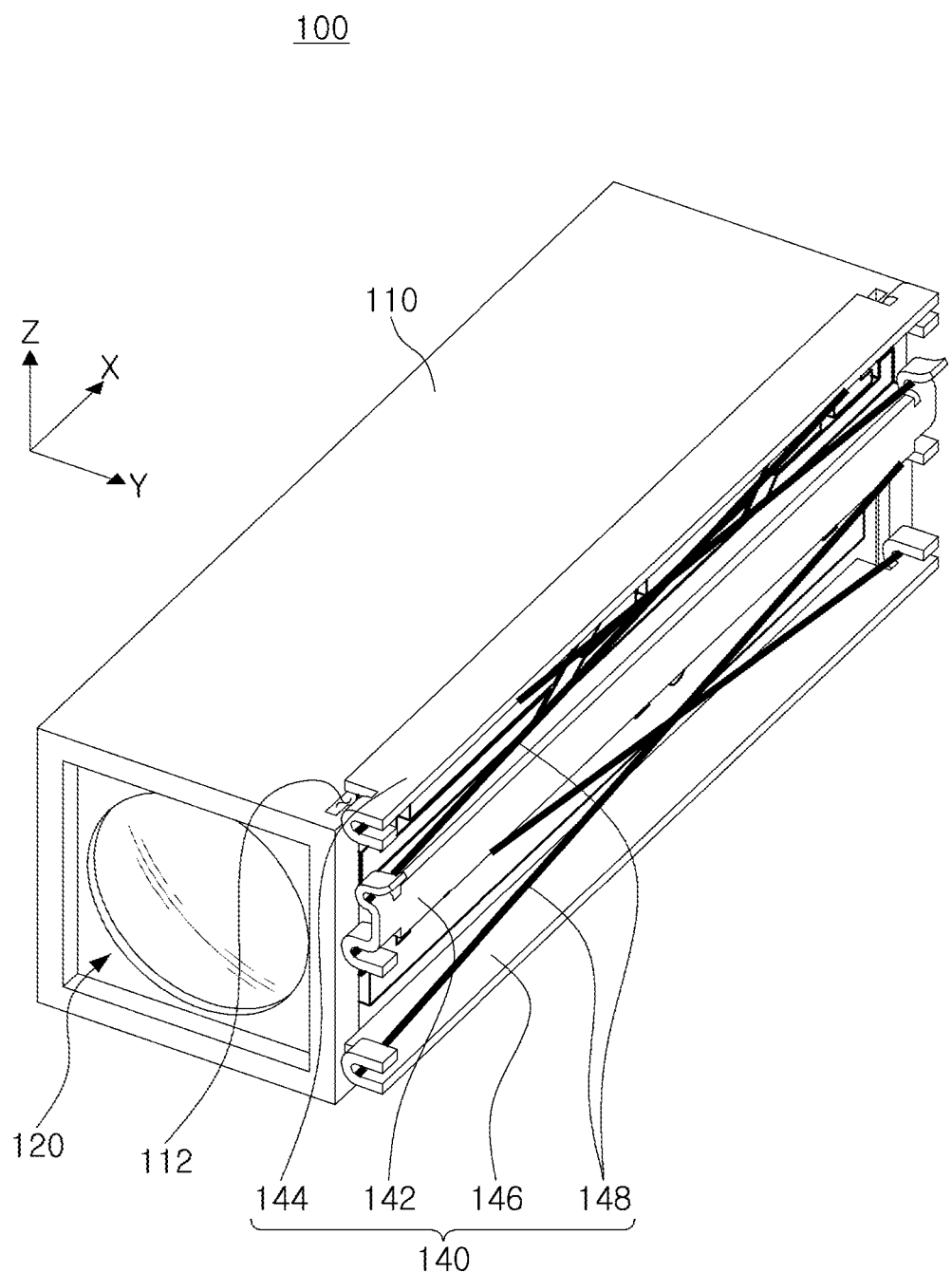
FIG. 3 is a perspective view of a lens module according to one or more examples.
Figure 4:
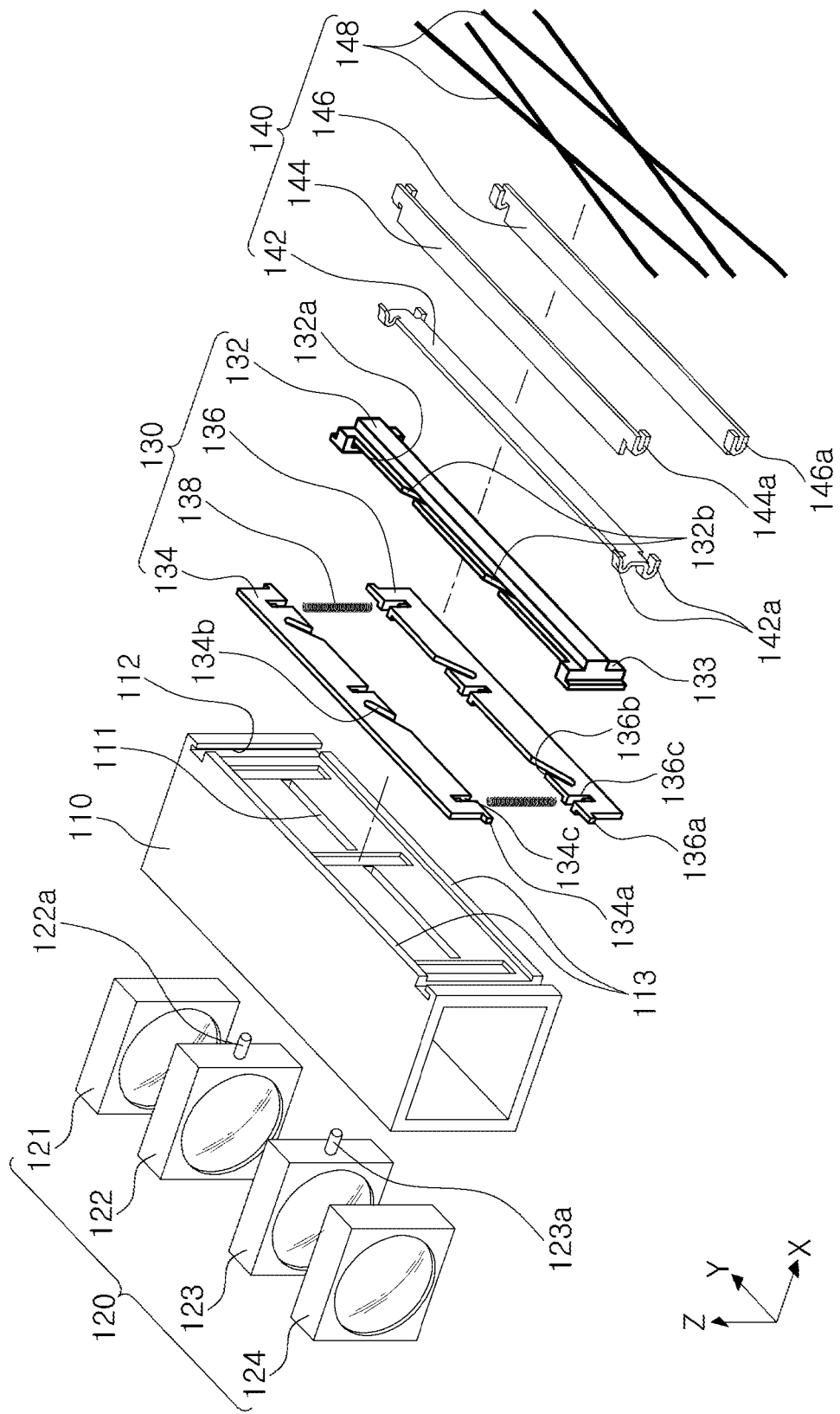
FIG. 4 is an exploded perspective view of the lens module according to one or more examples.

FIG. 3 is a perspective view of a lens module according to one or more examples and FIG. 4 is an exploded perspective view of the lens module according to one or more examples.

Referring to FIGS. 3 and 4, the lens module 100 may include a carrier 110, a lens unit 120, a lens guide unit 130, and a lens driving unit 140 by way of example.

The carrier 110 may have an internal space, and the lens unit 120 may be disposed in the internal space of the carrier 110. As an example, the carrier 110 may have a substantially rectangular parallelepiped box shape in which both end portions thereof are open. In addition, a guide hole 111 for connection between the lens guide unit 130 and the lens unit 120 may be formed in one side surface of the carrier 110. The guide hole 111 may be formed in an Y axis direction. The guide hole 111 may serve to guide movement of the lens unit 120.

Guide grooves 112 for guiding movement of the lens guide unit 130 in a Z axis direction may be formed in one side surface of the carrier 110. The guide grooves 112 may be disposed on both sides of the guide hole 111. A detailed description thereof will be provided below.

In addition, carrier stoppers 113 for limiting a movement range of the lens guide unit 130 may be provided on one side surface of the carrier 110. The carrier stoppers 113 may be disposed on upper and lower portions of the guide hole 111. A detailed description thereof will also be provided below.

Here, terms for directions will be defined. A height direction of the carrier 110 refers to a Z axis direction illustrated in FIGS. 3 and 4, a length direction of the carrier 110 refers to a Y axis direction illustrated in FIGS. 3 and 4, and a width direction of the carrier 110 refers to an X axis direction illustrated in FIGS. 3 and 4. In one or more examples as described herein, the height direction of the carrier 110 may align with the thickness direction of the portable electronic device 1.

The lens unit 120 may include a plurality of lens groups and may be installed in the carrier 110 to be disposed in the internal space of the carrier 110. As an example, the lens unit 120 may include a first lens group 121 fixedly installed on one end of the carrier 110, a second lens group 122 disposed on one side of the first lens group and movably installed in the carrier 110, a third lens group 123 disposed on one side of the second lens group 122 and movably installed in the carrier 110, and a fourth lens group 124 disposed on one side of the third lens group 123 and fixedly installed on the other end of the carrier 110.

The second and third lens groups 122 and 123 may be connected to the lens guide unit 130 and may be moved in the Y axis direction. To this end, the second and third lens groups 122 and 123 may have protrusions 122a and 123a for connection with the lens guide unit 130.

In addition, one or more of the first to fourth lens groups 121, 122, 123, and 124 constituting the lens unit 120 may include a plurality of lenses.

Figure 5:
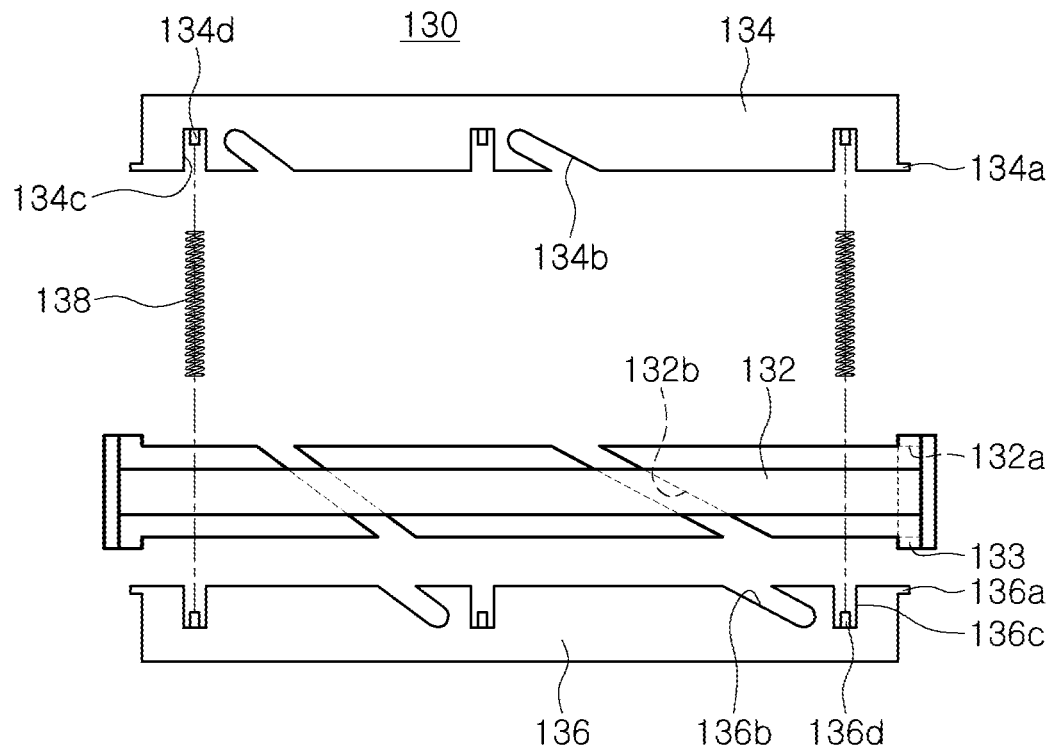
FIG. 5 is an exploded perspective view of a lens guide unit of the lens module according to one or more examples.
Figure 6:
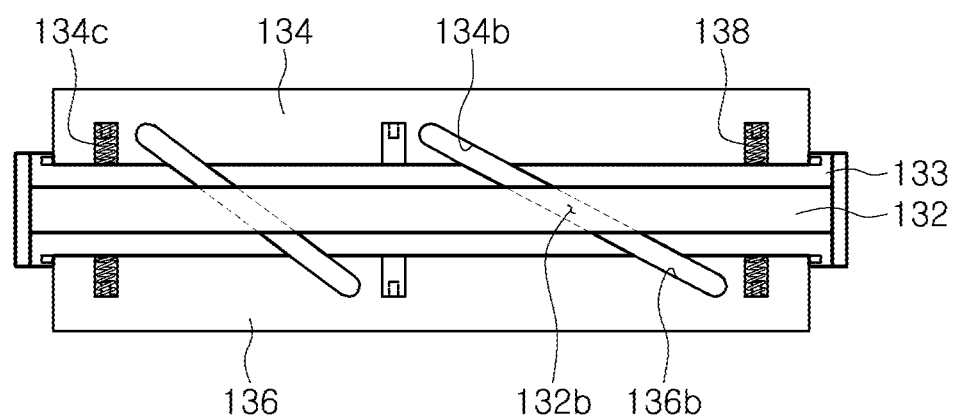
FIG. 6 is a front view of the lens guide unit of the lens module according to one or more examples.

The lens guide unit 130 may be connected to the lens unit 120 to serve to guide movements of some lens groups constituting the lens unit 120, that is, the second and third lens groups 122 and 123. As illustrated in more detail in FIGS. 5 and 6, the lens guide unit 130 may include, for example, a lens guide body 132, a first lens guide 134, a second lens guide 136, and springs 138.

Both end portions of the lens guide body 132 may have installation grooves 132a formed therein and the first and second lens guides 134 and 136 may be installed in the installation grooves 132a. That is, protruding portions 133 inserted into the guide grooves 112 of the carrier 110 may be provided on both end portions of the lens guide body 132, and the installation grooves 132a may be formed in the protruding portions 133. Therefore, the lens guide body 132 may be stably moved in a height direction of the carrier 110.

In addition, first guide grooves 132b for guiding movement paths of the protrusions 122a and 123a of the lens unit 120 may be formed in the lens guide body 132. As an example, the first guide grooves 132b may be inclined and may be formed in a rear surface of the lens guide body 132.

The lens guide body 132 may have an approximately rectangular plate shape.

The first lens guide 134 may have an approximately plate shape and may be installed on the lens guide body 132. Meanwhile, the first lens guide 134 may have insertion protrusions 134a inserted into the installation grooves 132a of the lens guide body 132 on both end portions thereof. Therefore, when the lens guide body 132 descends, the first lens guide 134 may descend together with the lens guide body 132.

In addition, first extending grooves 134b connected to the first guide grooves 132b of the lens guide body 132 may be formed in the first lens guide 134. In addition, first spring mounting grooves 134c supporting one end of each of the springs 138 and having one end of the springs 138 disposed therein may be provided in the first lens guide 134. A plurality of first spring mounting grooves 134c may be disposed to be spaced apart from each other, and a first coupling protrusion 134d coupled to the spring 138 may be formed in the first spring mounting groove 134c.

Meanwhile, a top surface of the first lens guide 134 may be supported by the carrier stopper 113 of the carrier 110. Therefore, even though the lens guide body 132 ascends, the first lens guide 134 may be prevented from departing from the carrier 110.

The second lens guide 136 may have an approximately plate shape and may be installed on the lens guide body 132. Meanwhile, the second lens guide 136 may have insertion protrusions 136a inserted into the installation grooves 132a of the lens guide body 132 on both end portions thereof. Therefore, when the lens guide body 132 ascends, the second lens guide 136 may ascend together with the lens guide body 132.

In addition, second extending grooves 136b connected to the first guide grooves 132b of the lens guide body 132 may be formed in the second lens guide 136. In addition, second spring mounting grooves 136c supporting one end of each of the springs 138 and having one end of the springs 138 disposed therein may be provided in the second lens guide 136. A plurality of second spring mounting grooves 136c may be disposed to be spaced apart from each other, and a second coupling protrusion 136d coupled to the spring 138 may be formed in the second spring mounting groove 136c.

A bottom surface of the second lens guide 136 may be supported by the carrier stopper 113 of the carrier 110. Therefore, even though the lens guide body 132 descends, the second lens guide 136 may be prevented from departing from the carrier 110.

The springs 138 may be installed so that first and second ends thereof are supported by the first and second lens guides 134 and 136, respectively. As an example, one end of each of the springs 138 may be installed on a corresponding first coupling protrusion 134d of the first lens guide 134, and the other end of each of the springs 138 may be installed on a corresponding second coupling protrusion 136d of the second lens guide 136. Therefore, each spring 138 may be disposed in a corresponding first and second spring mounting groove 134c and 136c.

The springs 138 may serve to provide restoring force to the first and second lens guides 134 and 136.

As an example, each of the springs 138 may be a coil spring.

Figure 7:
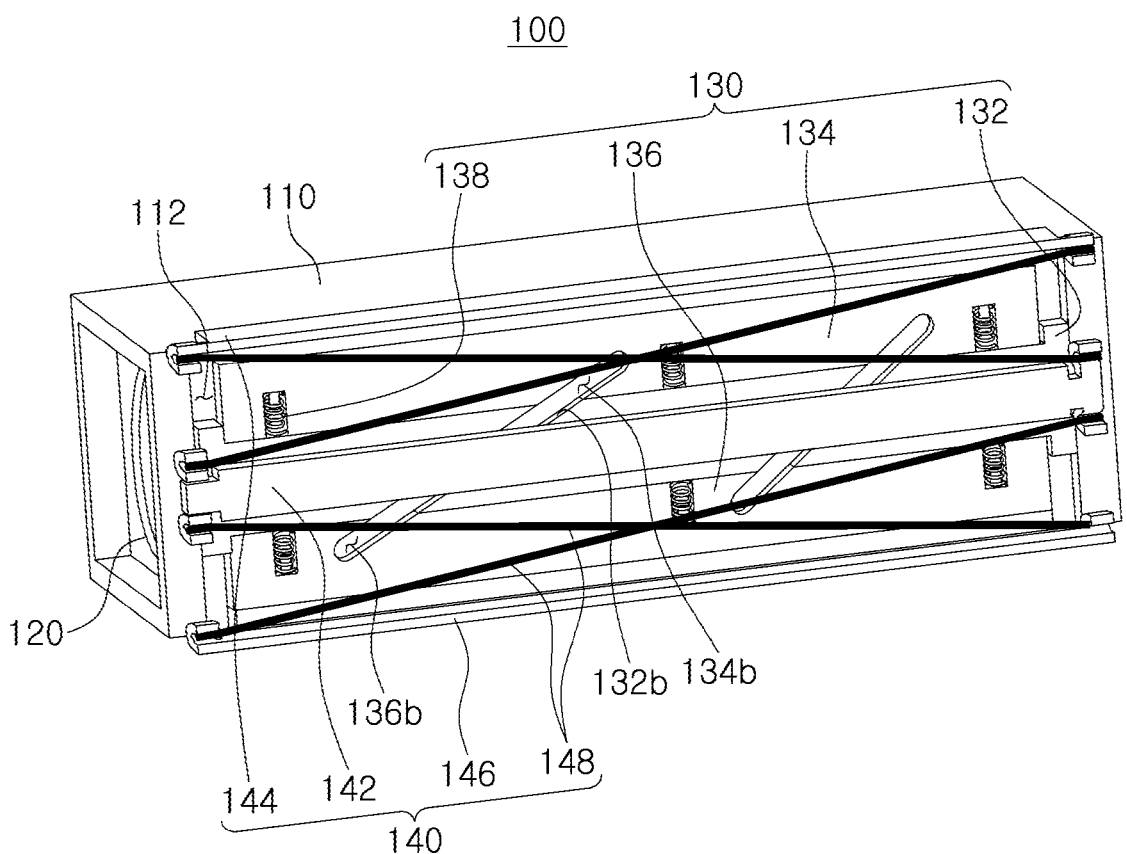
FIG. 7 is a perspective view of the lens module according to one or more examples when viewed from the front.

The lens driving unit 140 may generate driving force for moving the lens unit 120. As an example, as illustrated in more detail in FIG. 7, the lens driving unit 140 may include a lens driving unit body 142, a first installation member 144, a second installation member 146, and driving wires 148.

The lens driving unit body 142 may be fixedly installed on the lens guide body 132, and may have fixing tools 142a having the driving wires 148 installed on both end portions thereof. Two fixing tools 142a may be provided on each end portion of the lens driving unit body 142. As an example, the lens driving unit body 142 may have an approximately plate shape.

When the lens driving unit body 142 ascends and descends according to expansion and contraction of the driving wires 148, the lens guide body 132 on which the lens driving unit body 142 is fixedly installed may also ascend and descend together with the lens driving unit body 142.

The first installation member 144 may be fixedly installed on a top surface of the carrier 110. As an example, the first installation member 144 may have a substantially rectangular bar shape. In addition, first fixing tools 144a on which the driving wires 148 are installed may also be provided on both end portions of the first installation member 144.

In addition, the second installation member 146 may be fixedly installed on a bottom surface of the carrier 110. As an example, the second installation member 146 may have a substantially rectangular bar shape. In addition, second fixing tools 146a on which the driving wires 148 are installed may also be provided on both end portions of the second installation member 146.

One end of each of the driving wires 148 may be connected to the lens driving unit body 142, and the other end thereof may be connected to any one of the first and second installation members 144 and 146. That is, one end of each of the driving wires 148 may be fixedly installed on the fixing tools 142a of the lens driving unit body 142, and the other end thereof may be fixedly installed on any one of the first and second fixing tools 144a and 146a of the first installation member 144 or the second installation member 146. As an example, a plurality of driving wires 148 may be provided such that a pair of two driving wires 148 may be disposed on the upper portion of the lens driving unit body 142 and a pair of two driving wires 148 may be disposed on the lower portion of the lens driving unit body 142. In addition, the driving wires 148 in each pair of driving wires 148 may be disposed to intersect each other.

The driving wires 148 may be formed of a shape memory alloy. The second and third lens groups 122 and 123 of the lens unit 120 may be moved in the Y axis direction in the carrier 110 according to expansion and contraction of the driving wires 148 formed of the shape memory alloy. A more detailed driving method will be described later.

As described above, a movement distance of the second and third lens groups 122 and 123 may be increased, thereby preventing degradations in image quality of a high magnification zoom function.

In addition, by moving the second and third lens groups 122 and 123 through the lens driving unit 140 including the driving wires 148, the lens module 100 may be miniaturized and thinned.

Furthermore, by guiding the movements of the second and third lens groups 122 and 123 through the lens guide unit 130, the second and third lens groups 122 and 123 may be stably moved.

Further, the second and third lens groups 122 and 123 may be moved in a direction of incident light by moving the lens guide unit 130 upwardly and downwardly with the driving wires 148. Therefore, since the movement distance of the second and third lens groups 122 and 123 may be sufficiently secured, even though the driving wires 148 formed of the shape memory alloy may have a limited displacement amount, the degradation in the image quality of the high magnification zoom function may be prevented.

Hereinafter, an operation of the lens module according to one or more examples will be described with reference to the drawings.

FIGS. 8 through 15 are views illustrating an operation of the lens module according to one or more examples.

That is, FIGS. 8 through 11 are views illustrating an operation in which the second and third lens groups of the lens module according to one or more examples are moved in one direction, and FIGS. 12 through 15 are views illustrating an operation in which the second and third lens groups of the lens module according to one or more examples are moved in the other direction.

Now, an operation in which the second and third lens groups of the lens module according to one or more examples are moved in the one direction will be described with reference to FIGS. 8 through 11.

Figure 8:
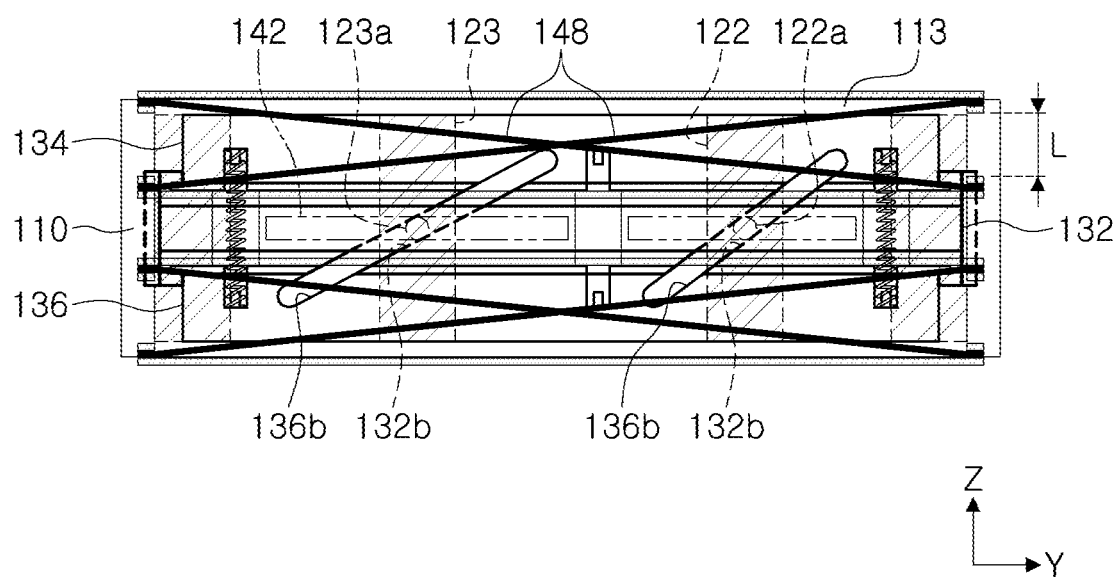
FIGS. 8, 9, 10, 11, 12, 13, 14, and 15 are views illustrating an operation of the lens module according to one or more examples.

As illustrated in FIG. 8, when power is not supplied to the driving wires 148, the lens driving unit body 142 may be disposed in a central portion of the carrier 110 (i.e., a central portion in the Z axis direction). In this case, the protrusions 122a and 123a of the second and third lens groups 122 and 123 may be disposed in central portions of the first guide grooves 132b included in the lens guide body 132 of the lens guide unit 130. In this case, a distance from the lens guide body 132 to the carrier stopper 113 may be L.

Figure 9:
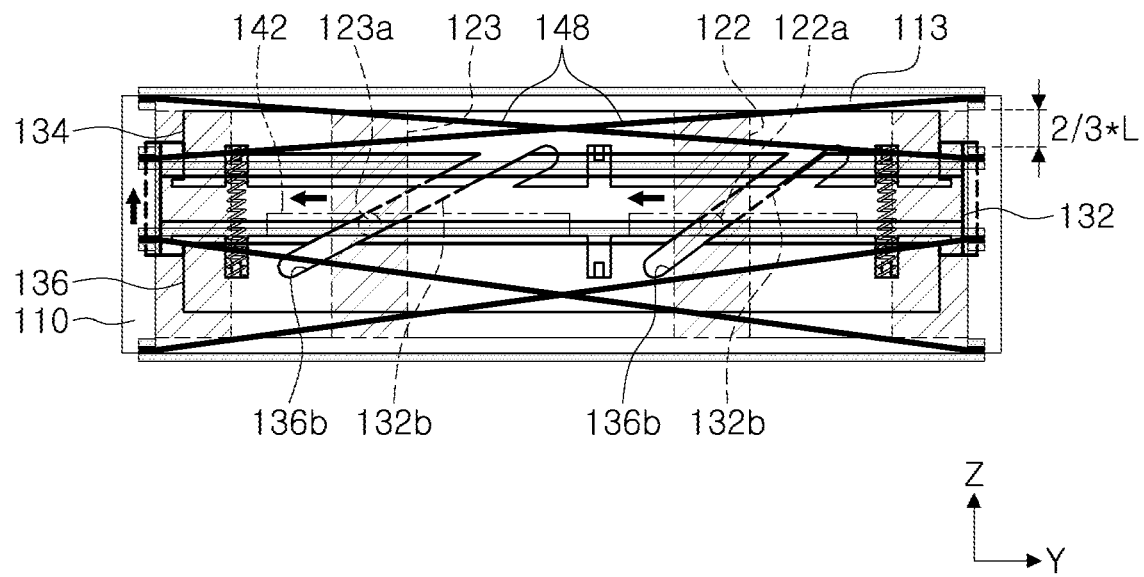

As illustrated in FIG. 9, the power may be supplied to the driving wires 148. That is, when the power is supplied to the pair of driving wires 148 disposed on an upper portion of the lens driving unit body 142, the pair of driving wires 148 disposed on the upper portion of the lens driving unit body 142 may be compressed. In addition, the pair of driving wires 148 disposed on a lower portion of the lens driving unit body 142 may be stretched.

Therefore, the lens driving unit body 142 may be moved in an upward direction of the Z axis. In addition, the lens guide body 132 of the lens guide unit 130 on which the lens driving unit body 142 is fixedly installed may be moved in the upward direction of the Z axis, together with the lens driving unit body 142. In this case, the first lens guide unit 134 may not be moved by the carrier stopper 113 of the carrier 110 and may maintain a fixed state, and the second lens guide 136 may be moved together with the lens guide body 132. In addition, a distance from the lens guide body 132 to the carrier stopper 113 may be $(2/3)*L$.

In addition, the protrusions 122a and 123a of the second and third lens groups 122 and 123 may be disposed at one end portion of each of the first guide grooves 132b included in the lens guide body 132 of the lens guide unit 130. Therefore, the second and third lens groups 122 and 123 may be moved to one side in the Y axis direction.

Figure 10:
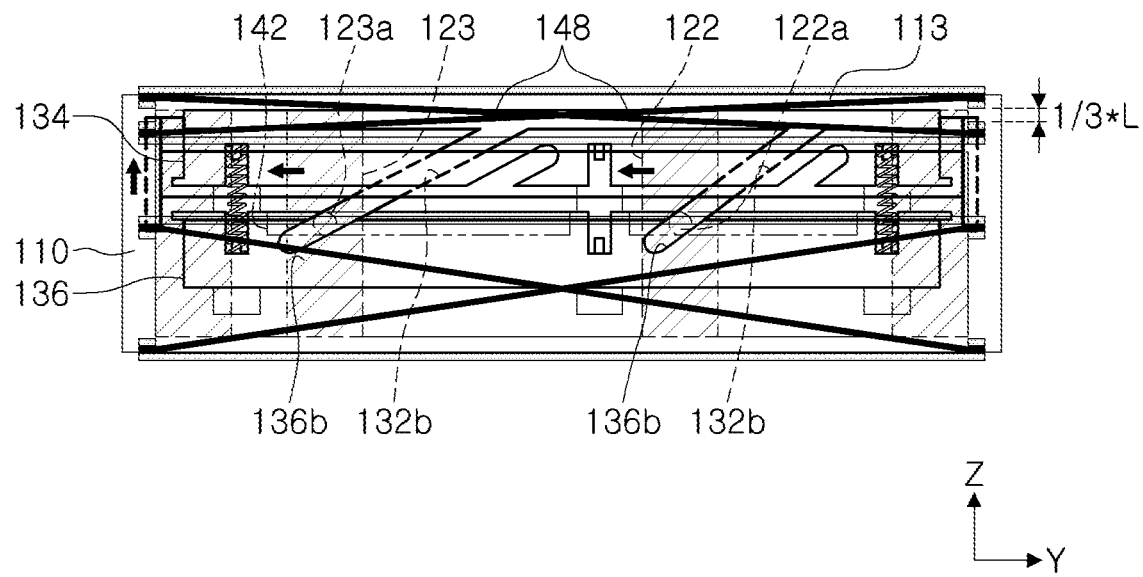

As illustrated in FIG. 10, when the power is continuously supplied to the driving wires 148, the pair of driving wires 148 disposed on the upper portion of the lens driving unit body 142 may be further compressed.

Therefore, the lens driving unit body 142 may be further moved in the upward direction of the Z axis. Therefore, the lens guide body 132 of the lens guide unit 130 on which the lens driving unit body 142 is fixedly installed may be further moved in the upward direction of the Z axis together with the lens driving unit body 142. In addition, the distance from the lens guide body 132 to the carrier stopper 113 may be $(1/3)*L$.

Furthermore, the second lens guide 136 installed on the lens guide body 132 may also be moved in the upward direction of the Z axis together with the lens driving unit body 142.

Therefore, the protrusions 122a and 123a of the second and third lens groups 122 and 123 may enter into the second extending grooves 136b included in the second lens guide 136 of the lens guide unit 130. As a result, the second and third lens groups 122 and 123 may be further moved to one side in the Y axis direction.

Figure 11:
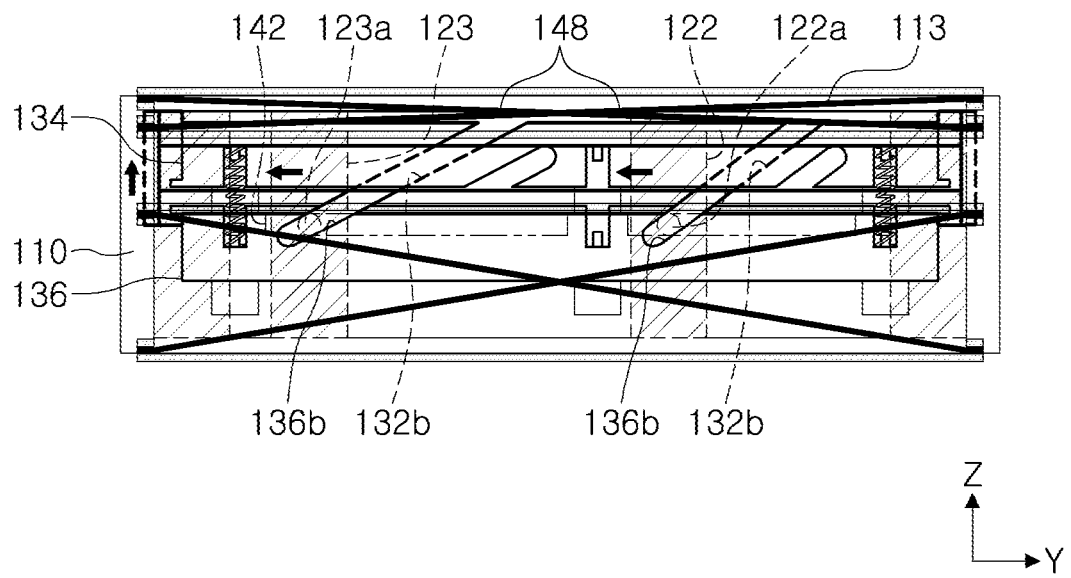

As illustrated in FIG. 11, when the power is continuously supplied to the driving wires 148, the pair of driving wires 148 disposed on the upper portion of the lens driving unit body 142 may be further compressed.

Therefore, the lens driving unit body 142 may be further moved in the upward direction of the Z axis. Therefore, the lens guide body 132 of the lens guide unit 130 on which the lens driving unit body 142 is fixedly installed may be further moved in the upward direction of the Z axis together with the lens driving unit body 142.

Therefore, the protrusions 122a and 123a of the second and third lens groups 122 and 123 may be disposed at ends of the second extending grooves 136b included in the second lens guide 136 of the lens guide unit 130. As a result, the second and third lens groups 122 and 123 may be further moved to one side in the Y axis direction.

Now, an operation in which the second and third lens groups of the lens module according to one or more examples are moved in the other direction will be described with reference to FIGS. 12 through 15.

Figure 12:
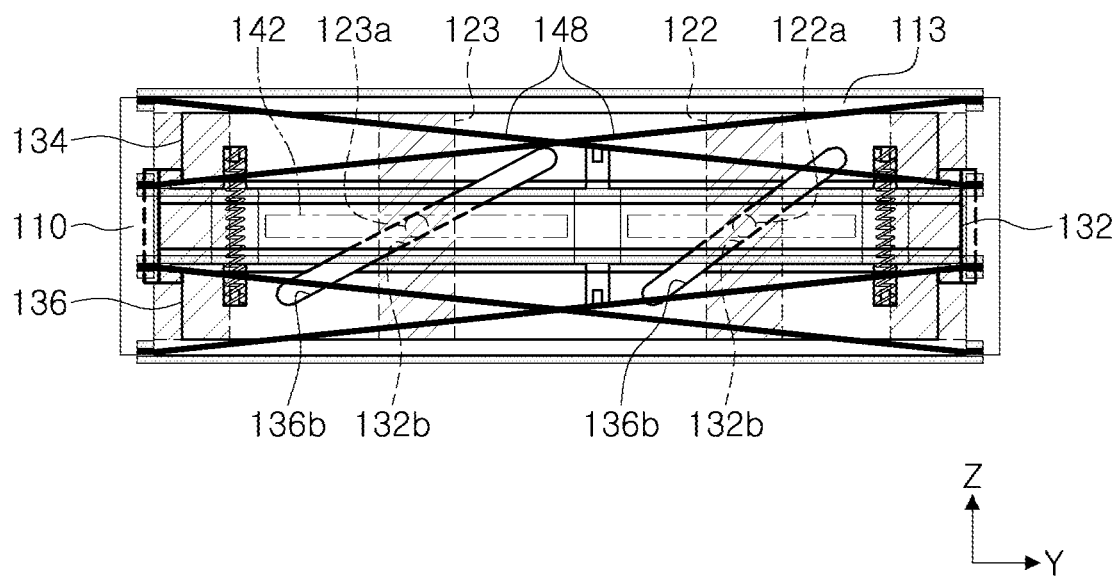

As illustrated in FIG. 12, when power is not supplied to the driving wires 148, the lens driving unit body 142 may be disposed at a central portion of the carrier 110 (i.e., a central portion in the Z axis direction). In this case, the protrusions 122a and 123a of the second and third lens groups 122 and 123 may be disposed at central portions of the first guide grooves 132b included in the lens guide body 132 of the lens guide unit 130. In this case, a distance from the lens guide body 132 to the carrier stopper 113 may be L.

Figure 13:
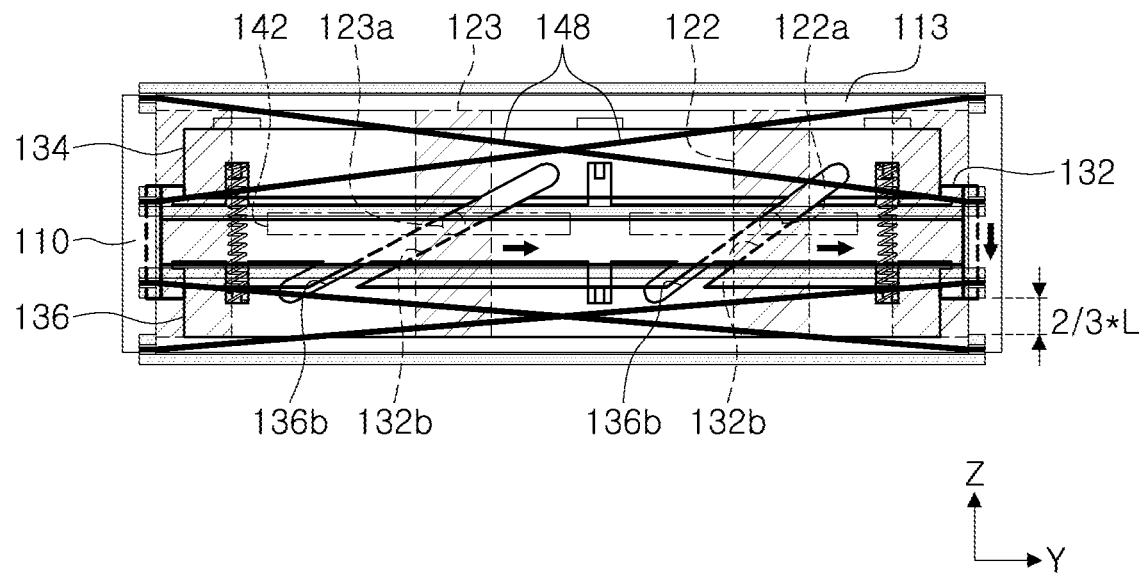

As illustrated in FIG. 13, the power may be supplied to the driving wires 148. That is, when the power is supplied to the pair of driving wires 148 disposed on a lower portion of the lens driving unit body 142, the pair of driving wires 148 disposed on the lower portion of the lens driving unit body 142 may be compressed. In addition, the pair of driving wires 148 disposed on the upper portion of the lens driving unit body 142 may be stretched.

Therefore, the lens driving unit body 142 may be moved in a downward direction of the Z axis. Therefore, the lens guide body 132 of the lens guide unit 130 on which the lens driving unit body 142 is fixedly installed may be moved in the downward direction of the Z axis together with the lens driving unit body 142. In this case, the second lens guide 136 may be supported by the carrier stopper 113 of the carrier 110 and may maintain a fixed state. In addition, the distance from the lens guide body 132 to the carrier stopper 113 may be (⅔)*L.

In addition, the protrusions 122a and 123a of the second and third lens groups 122 and 123 may be disposed at the other end portion of each of the first guide grooves 132b included in the lens guide body 132 of the lens guide unit 130. Therefore, the second and third lens groups 122 and 123 may be moved to the other side in the Y axis direction.

Figure 14:
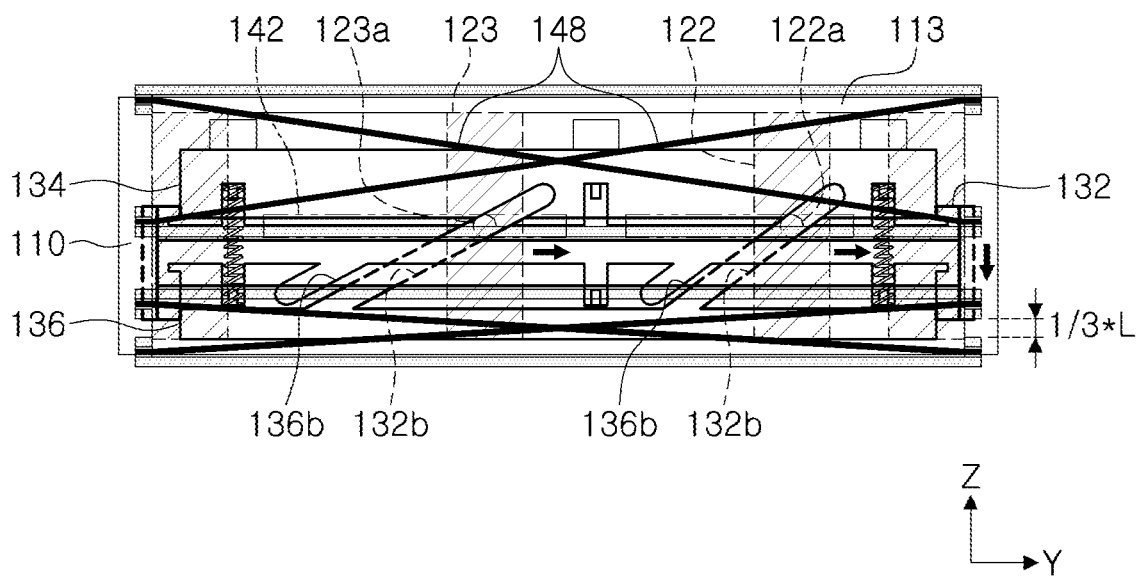

As illustrated in FIG. 14, when the power is continuously supplied to the driving wires 148, the pair of driving wires 148 disposed on the lower portion of the lens driving unit body 142 may be further compressed.

Therefore, the lens driving unit body 142 may be further moved in the downward direction of the Z axis. Therefore, the lens guide body 132 of the lens guide unit 130 on which the lens driving unit body 142 is fixedly installed may be further moved in the downward direction of the Z axis together with the lens driving unit body 142. In this case, the distance from the lens guide body 132 to the carrier stopper 113 may be (⅓)*L.

Furthermore, the first lens guide 134 installed on the lens guide body 132 may also be moved in the downward direction of the Z axis together with the lens driving unit body 142.

Therefore, the protrusions 122a and 123a of the second and third lens groups 122 and 123 may enter into the first extending grooves 134b included in the first lens guide 134 of the lens guide unit 130. As a result, the second and third lens groups 122 and 123 may be further moved to the other side in the Y axis direction.

Figure 15:
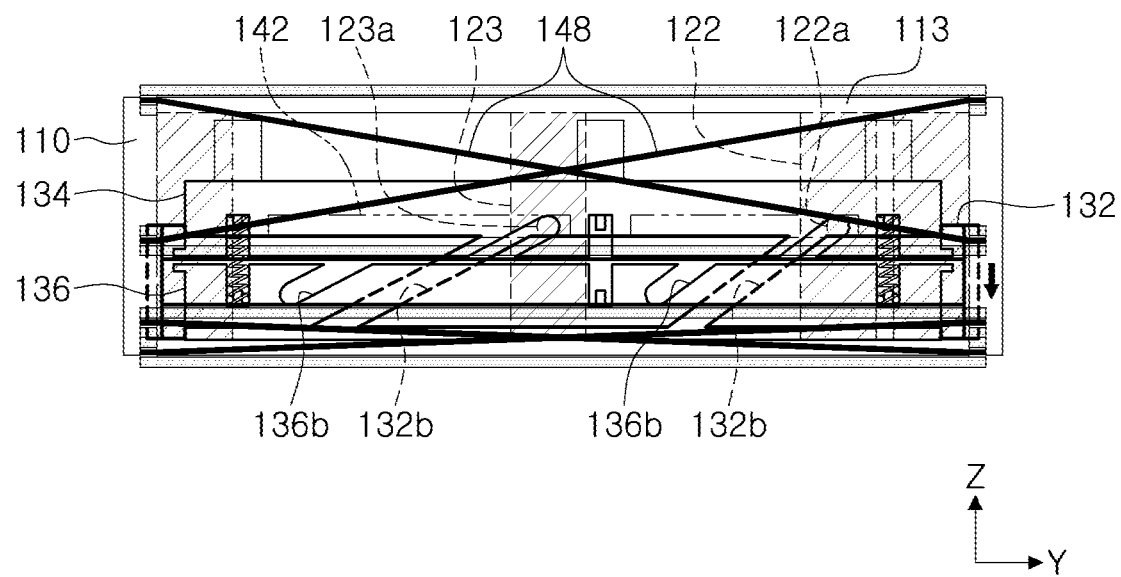

Thereafter, as illustrated in FIG. 15, when the power is continuously supplied to the driving wires 148, the pair of driving wires 148 disposed on the lower portion of the lens driving unit body 142 may be further compressed.

Therefore, the lens driving unit body 142 may be further moved in the downward direction of the Z axis. Therefore, the lens guide body 132 of the lens guide unit 130 on which the lens driving unit body 142 is fixedly installed may be further moved in the downward direction of the Z axis, together with the lens driving unit body 142.

Therefore, the protrusions 122a and 123a of the second and third lens groups 122 and 123 may be disposed at ends of the first extending grooves 134b included in the first lens guide 134 of the lens guide unit 130. As a result, the second and third lens groups 122 and 123 may be further moved to the other side in the Y axis direction.

As set forth above, according to the examples described herein, the degradation in the image quality of the high magnification zoom function may be prevented.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A lens module comprising:
a carrier comprising an internal space;
a lens unit comprising a plurality of lens groups and disposed in the carrier so that one or more of the lens groups is movable in a length direction of the carrier;
a lens guide unit connected to the one or more movable lens groups to guide movement of the one or more movable lens groups; and
a lens driving unit connected to the lens guide unit and comprising a plurality of driving wires comprising a shape memory alloy,
wherein the lens guide unit is moved in a height direction of the carrier by expansion and contraction of the plurality of driving wires to move the one or more movable lens groups in the length direction of the carrier, and wherein guide grooves for guiding the movement of the lens guide unit are disposed on both sides of a guide hole of the carrier.

2. The lens module of claim 1, wherein the plurality of driving wires are disposed in pairs comprising two wires disposed to intersect each other, and
two of the pairs of driving wires are disposed to be spaced apart from each other in the height direction of the carrier.

3. The lens module of claim 2, wherein the lens driving unit further comprises:
a lens driving unit body fixed on the lens guide unit;
a first installation member fixed on the carrier disposed above an upper portion of the lens driving unit body;
a second installation member fixed on the carrier disposed below a lower portion of the lens driving unit body; and
the driving wires comprising one end connected to any one of the first and second installation members and the other end connected to the lens driving unit body.

4. The lens module of claim 3, wherein when one pair of the two pairs of driving wires is contracted, the remaining pair of driving wires is stretched.

5. The lens module of claim 1, wherein the guide hole is disposed in one side surface of the carrier, and the guide hole is configured to guide the movement of the one or more movable lens groups.

6. The lens module of claim 5, wherein the one side surface of the carrier comprises carrier stoppers disposed on upper and lower portions of the guide hole to limit the movement of the lens guide unit.

7. The lens module of claim 1, wherein the plurality of lens groups comprise:
a first lens group fixed on one end of the carrier,
a second lens group disposed on a rear end of the first lens group according to a direction of incident light and being one of the one or more movable lens groups,
a third lens group disposed on a rear end of the second lens group and being another one of the one or more movable lens groups, and
a fourth lens group disposed on a rear end of the third lens group and fixed on the other end of the carrier.

8. The lens module of claim 7, wherein the second and third lens groups comprise protrusions connected to the lens guide unit.

9. The lens module of claim 1, wherein the lens guide unit comprises:
a lens guide body disposed on the carrier to ascend and descend in the height direction of the carrier;
a first lens guide disposed on an upper portion of the lens guide body;
a second lens guide disposed on a lower portion of the lens guide body; and
a spring comprising one end supported by the first lens guide and the other end supported by the second lens guide.

10. The lens module of claim 9, wherein both end portions of the lens guide body comprise installation grooves disposed therein, the first and second lens guides being disposed in the installation grooves.

11. The lens module of claim 9, wherein the lens guide body comprises first guide grooves disposed therein, the first guide grooves guiding the movement of the one or more movable lens groups.

12. The lens module of claim 11, wherein the first and second lens guides comprise respective first and second extending grooves disposed therein, respectively, the first and second extending grooves being connected to the first guide grooves.

13. The lens module of claim 12, wherein the first and second lens guides further comprise respective first and second spring mounting grooves disposed therein, respectively, the spring being disposed in the first and second spring mounting grooves.

14. The lens module of claim 9, wherein the first lens guide is supported by a carrier stopper disposed on an upper end portion of one side surface of the carrier, and
the second lens guide is supported by a carrier stopper disposed on a lower end portion of the one side surface of the carrier.

15. A camera module comprising:
a reflecting module converting a path of light incident thereinto; and
the lens module of claim 1 through which the light having the path converted by the reflecting module passes.

16. A portable electronic device, comprising:
the camera module of claim 15; and
an image sensor configured to convert light that passes through the lens module into an electrical signal.

17. A lens module, comprising:
a movable lens group comprising one or more lenses, and movable in an optical axis direction of the one or more lenses;
a lens guide unit connected to the one or more movable lens groups, and
a lens driving unit, coupled to the movable lens group, and configured to move the movable lens group in the optical axis direction in response to a movement of the lens driving unit in a direction substantially perpendicular to the optical axis direction by expansion of a shape memory alloy,
wherein guide grooves for guiding a movement of the lens guide unit are disposed on both sides of a guide hole in one side surface of a carrier of the lens module.

18. A camera module comprising:
a reflecting module configured to convert a path of light incident thereinto; and
the lens module of claim 17 through which the light having the path converted by the reflecting module passes through the one or more lenses.

19. A portable electronic device, comprising:
a case comprising a thickness, a width greater than the thickness, and a length greater than the thickness;
the camera module of claim 18 disposed in the case; and
an image sensor configured to convert light that passes through the lens module into an electrical signal,
wherein the optical axis direction is substantially perpendicular to a thickness direction of the case.

* * * * *